Figure 1:
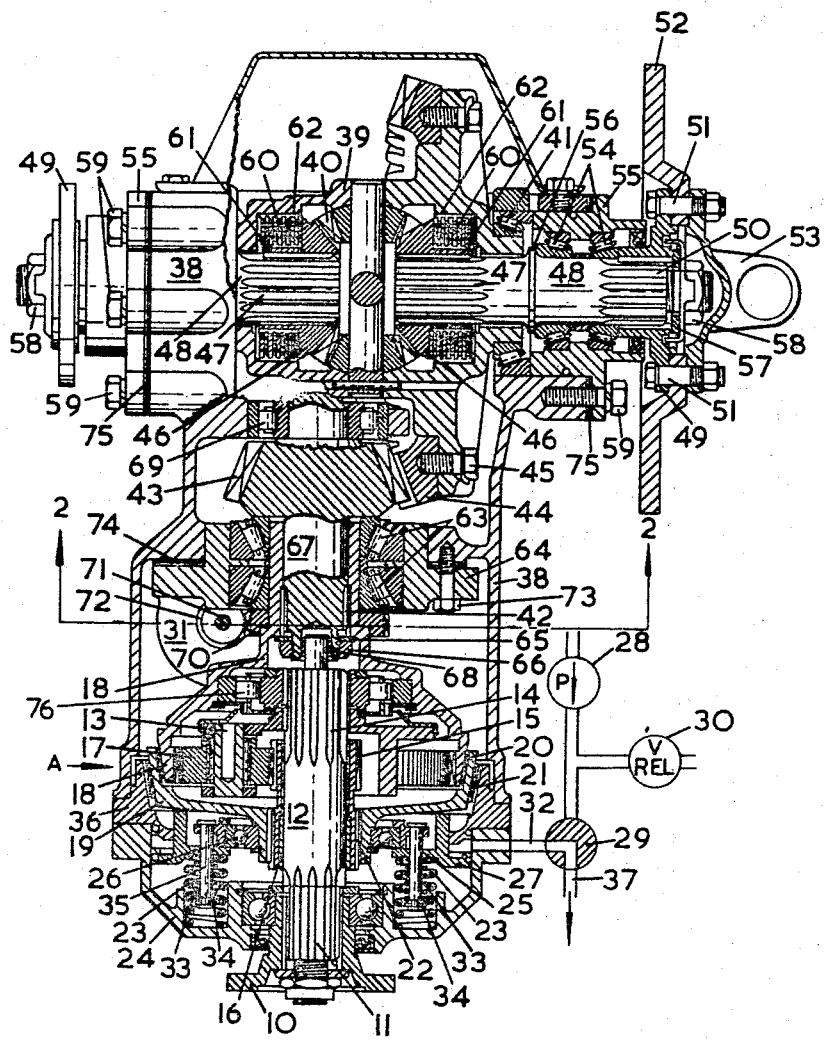

United States Patent Office 3,315,544
Patented Apr. 25, 1967

3,315,544
VEHICULAR DRIVING AXLE
Axel C. Wickman, Sarasota, Fla., and Randle Leslie Abbott, Leamington Spa, England, assignors to Axel Wickman Transmissions Limited, Coventry, Warwickshire, England
Filed Dec. 7, 1964, Ser. No. 416,297
8 Claims. (Cl. 74—695)

The invention relates to an axle for driving the road wheels of a motor vehicle. The power transmission systems of the majority of motor vehicles comprise a prime mover arranged at one end of the vehicle and connected to drive the power input shaft of a main change-speed gearing arranged at the same end of the vehicle, the power output shaft of the main change-speed gearing being connected by a propeller shaft to drive an axle at the other end of the vehicle. With this type of power transmission system an auxiliary change-speed gearing, such as an epicyclic overdrive or underdrive, is frequently arranged either between the engine and the power input shaft of the main change-speed gearing, or between the power output shaft of the main change-speed gearing and the propeller shaft. Also with this type of power transmission system the driving axle must be provided with a right-angle drive, such as a hypoid crown wheel and pinion, and the pinion is conventionally supported by thrust bearings for absorbing the end thrust generated on the pinion when it is transmitting torque to the crown wheel. An object of the invention is to provide an improved axle for driving the road wheels of a motor vehicle.

According to the invention an axle, for driving the road wheels of a motor vehicle, has a right-angle gear drive which includes a driving gear meshing with a driven gear that is adapted to drive the said road wheels, a two-speed epicyclic gearing carried by the axle and having a power input member adapted to be driven by the vehicle propulsion engine, and a power output member of the epicyclic gearing connected to drive the driving gear of the right-angle gear drive.

In the case where the longitudinal axes of the driving and driven gears do not intersect, the driving gear may, according to a further feature, be connected to be driven from the power output member of the epicyclic gearing by a hollow drive shaft, a power input shaft is adapted to be driven at one end by the vehicle propulsion engine and extends coaxially through the hollow drive shaft for its other end to drive the power input member of the epicyclic gearing, and the latter is arranged on the opposite side of the driven gear to the said one end of the power input shaft. In such a case, and according to another feature, the longitudinal axis of the driven gear may cross the power input shaft intermediate its said one end and the driving gear.

According to a further feature a gear for providing a speedometer drive may be arranged to be coaxial with and rotatively secured to the said driving gear. Preferably the gear for providing the speedometer drive is, according to another feature, connected to drive a pump which is arranged to provide a supply of pressurized fluid for the epicyclic gearing. In this latter case the speedometer drive may, according to yet another feature, include a gear train of which two meshing gears constitute the pump.

Figure 2:
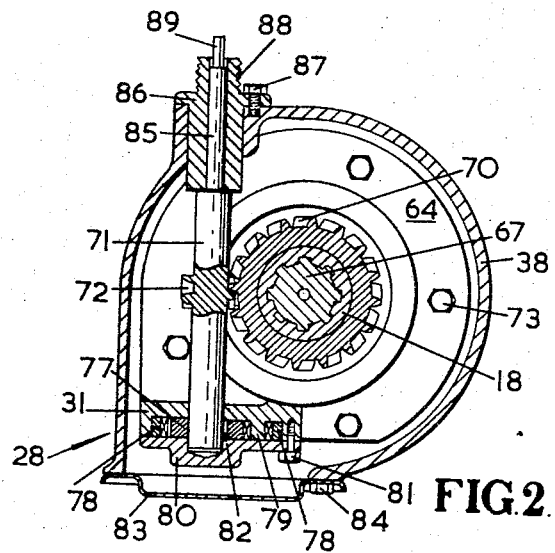
Figure 3:
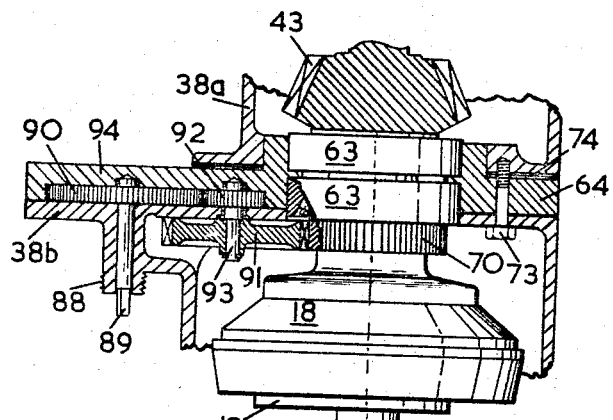
Figure 4:
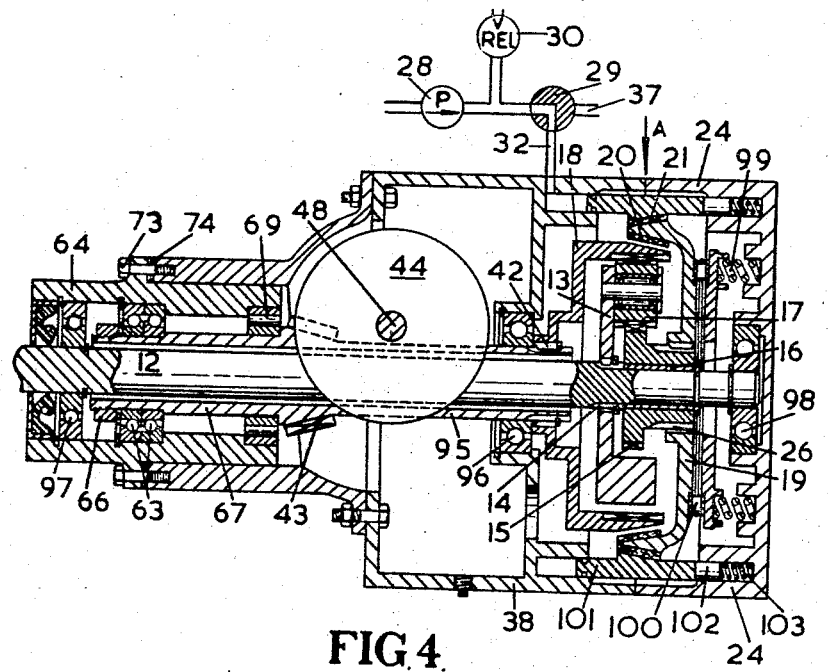
Figure 5:
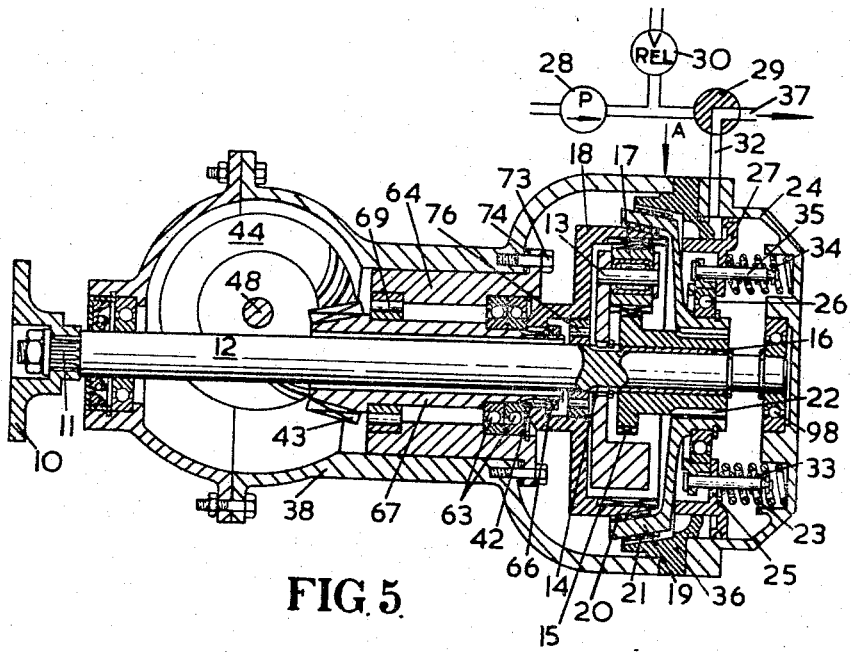

The invention is illustrated, by way of example only, by the accompanying drawings, in which:
FIGURE 1 is a horizontal axial section of an axle for driving the road wheels of a motor vehicle;
FIGURE 2 is a section taken on the line 2—2 of FIGURE 1;
FIGURE 3 is a scrap horizontal axial section corresponding with FIGURE 1, but showing an alternative pump and speedometer drive and some parts in elevation;
FIGURE 4 is a vertical axial section of another axle for driving the road wheels of a motor vehicle, and
FIGURE 5 shows some modifications that may be made to the axle illustrated in FIGURE 4.

In FIGURE 1 a flange 10 is adapted to be driven by a conventional propeller shaft from a prime mover and a main change-speed gearing which are arranged at the opposite end of the vehicle. The flange 10 is drivingly connected by splines 11 to a power input shaft 12 of a two-speed epicyclic gearing which is indicated generally by arrow A. Power input shaft 12 is connected to drive a planet carrier 13 through splines 14, and supports a sun gear wheel 15 through a journal bearing 16. A planet gear wheel 17 is journalled from the planet carrier 13 and meshes with the sun gear wheel 15 and with an annulus gear wheel 18 which constitutes the power output member of the epicyclic gearing A.

A friction engaging member 19 is provided with a frusto-conical clutch pad 20 and a frusto-conical brake pad 21, and is drivingly connected to the sun wheel 15 by splines 22 which allow the clutch member 19 to be moved axially relatively to the sun wheel 15. A series of compression coil springs 23 are arranged in a circle about shaft 12 and react between a casing 24 and an annular flange 25 which engages a thrust race 26 to urge the clutch pad 20 of friction engaging member 19 into engagement with a frusto-conical clutch surface formed on the annulus gear wheel 18. The frictional engagement of clutch pad 20 with the annulus gear wheel prevents relative rotation between the sun gear wheel 15 and the annulus gear wheel 18 and causes the epicyclic gearing A to transmit drive at unit ratio.

The flange 25 is formed integral with an annular piston 27 which is sealingly guided for axial movement by the casing 24. A pump 28 is shown diagrammatically in the drawing supplying a control valve 29 with oil under a pressure determined by a relief valve 30. The pump 28 is actually disposed inside a casing 31 and is driven in a manner that will be described later. However the control valve 29 can be operated, for example by a solenoid actuated by an electrical switch arranged on the vehicle dashboard, to connect the supply of oil under pressure from pump 28 to a passage 32 which leads to the operative surface of annular piston 27. When oil is supplied through passage 32 the piston 27 causes flange 25 to relieve the force of springs 23 from thrust race 26 and to apply an opposite force to the thrust race through a series of compression coil springs 33, circlips 34 and studs 35 which are held axially fast with the thrust race 26. The axial force applied to the thrust race 26 through studs 35 moves the friction engaging member 19 axially along splines 22 for the clutch pad 20 to disengage the annulus gear wheel 18, and for the brake pad 21 to engage a frusto-conical brake surface formed on a ring 36 fast with the casing 24. The frictional engagement of brake pad 21 with the ring 36 holds the sun gear wheel 15 rotatively stationary and causes the epicyclic gearing A to transmit drive at its planetary overdrive ratio. When the control valve 29 is returned to the position illustrated, the oil acting on the annular piston 27 is exhausted through the passage 32 and a passage 37 which discharges into an oil sump defined by casing 24, ring 36 and by an axle casing 38.

In the axle casing 38 a cage 39, for a differential gearing 40, is supported by two bearings 41 only one of which is shown, and is driven from the annulus gear wheel 18 of the epicyclic gearing A through splines 42 and a pinion 43 which meshes with a crown wheel 44 connected to the cage 39 by bolts 45. The differential gearing 40 includes a pair of sun wheels 46 connected by splines 47 to drive halfshafts 48 which are arranged to drive hubs 49 through splines 50. As indicated on the right-hand side of FIGURE 1, each hub 49 may be secured by a series of bolts 51 to a brake disc 52 and to a universal joint, part of which is indicated at 53. Each halfshaft 48 is supported by combined thrust and journal bearings 54 in a housing 55 and is located axially by an integral flange 56, washer 57, and a nut 58 which urges hub 49 towards flange 56. Each housing 55 is arranged in a bore formed in the axle casing 38 and is kept in place by a series of bolts 59 which coact with threaded bores in the axle casing 38.

A series of clutch plates 60 are arranged between an externally-splined portion 61 of each sun wheel 46 and an internally-splined portion 62 of the cage 39 so that alternate clutch plates of each series are drivingly connected to the cage 39 and the remaining clutch plates are drivingly connected to the sun wheels 46. In this manner the end thrust generated on the sun wheels 46, due to the cage 39 transmitting torque to the halfshafts 48, urges the clutch plates 60 of each series into frictional contact to impose a frictional drag between each sun wheel 46 and the cage 39 whereby to control the extent of differential motion between the halfshafts 48.

The annulus gear wheel 18 and the pinion 43 are supported by combined thrust and journal bearings 63 in a housing 64, and are held axially fast by a washer 65 and a nut 66 coacting with the pinion shaft 67 which additionally provides a spigot bearing 68 for the power input shaft 12. The pinion 43 is additionally supported from the axle casing 38 by a roller bearing 69 so that journal loads imposed on the pinion 43 are distributed between bearings 63 and 69. An axial force is generated on the pinion 43 when it transmits torque to the crown wheel 44, and this force is proportional to the torque transmitted and is directed towards the power input shaft 12 when the vehicle is being driven forwards. This axial force is resisted solely by bearings 63 which also serve to resist the axial reaction on the annulus gear wheel 18 caused by the engagement of clutch member 19 under the influence of springs 23. However, the axial reaction on the annulus gear wheel 18 is opposed to the end thrust generated by the pinion 43 and this reduces the axial force that the bearings 63 have to carry.

The axial force on the bearings 63 is only reduced when the unit ratio of the epicyclic gearing A is engaged. This is, however, preferable with the embodiment illustrated in FIGURE 1 as the torque transmitted by the pinion 43 is, for a given power output of the prime mover, inversely proportional to its speed and the torque transmitted by the pinion, and thus the end thrust generated is greater when unit ratio of the epicyclic gearing A is engaged than when the overdrive ratio is engaged.

A skew gear wheel 70 is trapped axially between the annulus gear wheel 18 and the inner race of one of the bearings 63 by the action of nut 66, and is accordingly driven at the same speed as the annulus gear wheel. Gear wheel 70 drives a shaft 71, arranged at right-angles to the power input shaft 12, through a coacting skew gear wheel 72 and the shaft 71 is arranged to drive the pump 28 which is arranged, as previously stated, in the casing 31.

The housing 64 is secured to the axle casing 38 by bolts 73, and shims 74 are arranged between housing 64 and casing 38 for adjusting the presentation of the pinion 43 to the crown wheel 44. Transverse adjustment of the crown wheel 44 is obtained by shims 75 arranged between each housing 55 and the axle casing 38, the transverse position of the crown wheel 44 being determined by the engagement of housings 55 with the outer races of the bearings 41.

A one-way clutch 76 is provided to prevent the annulus gear wheel 18 from rotating slower than the power input shaft 12.

FIGURE 2 shows in greater detail the drive from gear wheel 70 to the pump, which is indicated generally by arrow 28 and comprises a gear wheel 77 meshing on one side with an internal gear wheel 78 and separated from the latter on the opposite side by a crescent member 79 formed integral with the casing 31. The gear wheels 77 and 78 are retained in the casing 31 by an end plate 80 and bolts 81, and the gear wheel 77 is driven from the lower end of the shaft 71 by a key 82. The pump 28 is provided with an inlet port and an outlet port which are not shown but are disposed at opposite ends of the crescent member 79, and the pumping action is achieved in a well-known manner by the spaces between the teeth of gear wheels 77 and 78 carrying oil from the inlet port, past the crescent member 79, to the exhaust port. The axle casing 38 is formed open underneath the end plate 80 to provide access thereto, and this opening is normally sealed by a cover 83 which is held in position by a series of bolts 84. The casing 31 is formed as part of housing 64 and provides a journal bearing for the lower end of the shaft 71, the upper end of which is formed with a reduced diameter portion 85 supported by a bush 86 from the axle casing 38. The bush 86 is held in place by bolts 87 and is provided with a threaded nipple 88 for attachment to a speedometer drive cable which is to be driven in the usual manner from a squared end 89 of portion 85.

An alternative pump and speedometer drive is illustrated in FIGURE 3, in which the squared end 89 for driving the speedometer cable is rotatively fast with a gear wheel 90 which is driven from gear wheel 70 by gear wheels 91 and 92 drivingly connected by a spindle 93. Housing 64 is extended radially outwards to form a casing 94 for the gear wheels 90 and 91, and thus splits the axle casing into two separate portions 38a and 38b of which the latter supports gear wheels 90, 91 and 92 and sealingly engages casing 94. The gear wheels 90 and 92 constitute an alternative gear pump to the pump 28 shown in FIGURES 1 and 2, being provided in a well-known manner with an inlet port and an outlet port which are not shown but are disposed on opposite sides of the point where gear wheels 90 and 92 mesh.

The embodiments illustrated in FIGURES 4 and 5 have many parts in common with the embodiment illustrated in FIGURE 1 and, accordingly, these parts have been given the same reference numerals and may be assumed to have the same general function.

FIGURE 4 shows an axle in which a two-speed epicyclic gearing A is arranged on the opposite side of the crown wheel 44 to the power input shaft 12. The pinion shaft 67 is formed hollow with a tubular extension 95 which is supported by a ball race 96 from a web of the axle casing 38 and is driven from the annulus gear wheel 18 through splines 42. The planet carrier 13 is driven through splines 14 from the power input shaft 12 which passes coaxially with clearance through the hollow pinion shaft 67 and its extension 95 and is supported by a ball race 97 from the housing 64 and by a ball race 98 from casing 24. As a hypoid crown wheel 44 and pinion 43 are employed the extension 95 is able to pass the crown wheel without fouling the halfshafts 48.

The gear train of the epicyclic gearing A in FIGURE 4 is identical with that described with reference to FIGURE 1, however, the gear-changing arrangement is slightly different in that the friction engaging member 19 is urged by a series of compression coil springs 99 acting between the casing 24 and a thrust race 100 for clutch surface 20 to engage the annulus gear wheel 18 to provide unit ratio. The frusto-conical brake surface 21 is directed oppositely to clutch surface 20 and is for engagement by an annular piston 101 which is guided for axial movement and is prevented from rotating by a series of axially-directed pins 102 coacting with corresponding bores in the casing 24. Thus, when the control valve 29 is actuated to the position shown, fluid pressure causes the annular piston 101 to engage brake surface 21 and to disengage clutch surface 20 from the annulus gear wheel 18 by sliding the friction engaging member 19 along its splines 26, whereby to effect a power gear change from unit ratio to the planetary overdrive ratio. When the control valve 29 is actuated to connect passage 32 to passage 37, compression coil springs 103 return the annular piston 101 to its inoperative position whilst springs 99 cause friction engaging member 19 to slide along splines 26 for clutch surface 20 to engage the annulus gear wheel 18 and, in this manner, a power gear change is made from the planetary overdrive ratio to unit ratio. It should be noted that, with this arrangement, the one-way clutch 76 of FIGURE 1 is not required. If desired, the gear-changing arrangement of FIGURE 1 may be substituted by the gear-changing arrangement of FIGURE 4.

FIGURE 5 is similar to FIGURE 4 but shows a number of modifications. The pinion 43 is placed on the opposite side of the crown wheel 44 thus eliminating the extension 95 of FIGURE 4, the annulus 18 being connected directly to the pinion shaft by splines 42. The epicyclic gearing A and its gear-changing arrangement are substantially identical with those shown in FIGURE 1 and, thus, FIGURES 4 and 5 illustrate how readily different gear-changing arrangements can be applied to the epicyclic gearing A. Another important modification shown in FIGURE 5 is that the housing 64 supporting the pinion 43 from the axle casing 38 is mounted within the casing of the epicyclic gearing A, thus enabling the mating of the crown wheel 44 and pinion 43 to be adjusted without disconnecting the power input shaft 12 from the engine-driven propeller shaft. However, when the pinion 43 is moved from the position shown in FIGURE 4 to that shown in FIGURE 5, it is necessary for the crown wheel 44 to be reversed as shown, otherwise the direction in which the halfshafts 48 are driven will be reversed.

The embodiments of FIGURES 4 and 5 enable an overdrive or underdrive epicyclic gearing A to be placed in a more accessible position than previously taught, and the embodiment of FIGURE 5 enables the pinion 43 to be adjusted or removed after the epicyclic gearing A has been detached from the axle casing 38.

The particular epicyclic gear train illustrated may be replaced, if desired, by other epicyclic gearings which provide either overdrve or underdrive ratios, and the apparatus for effecting gear changes may also be altered if desired.

Throughout this document the word "axle" is used to define both rigid beam axles and axles of the kind which drive independently suspended road wheels. However, although the two-speed epicyclic gearing may be applied to a rigid beam axle, it is preferable to use it with an axle which is mounted substantially rigidly from the chassis frame or the like and drives independently supported road wheels, whereby the weight of the epicyclic gearing is not added to the unsprung weight of the axle.

What we claim as our invention and desire to secure by Letters Patent of the United States is:

1. An axle, for driving road wheels of a motor vehicle, including an axle casing, a driving gear, a driven gear meshing with said driving gear, bearing means supporting said driving gear and said driven gear for rotation about their respective axes, said bearing means arranged for the axis of rotation of said driving gear to lie in a plane at right-angles to a plane containing the axis of rotation of said driven gear whereby said driving gear and said driven gear constitute a right-angle gear drive, said driven gear adapted to drive the said road wheels, the axis of rotation of said driving gear spaced from the axis of rotation of said driven gear, a two-speed epicyclic gearing carried by said axle casing, a power input shaft to said epicyclic gearing, a power output member from said epicyclic gearing, driving means interconnecting said power output member from said epicyclic gearing to said driving gear, said power output member from said epicyclic gearing and said driving gear formed with a coaxial bore, said power input shaft extending through said bore, one end of said power input shaft adapted to be driven from a power source, the other end of said power input shaft adapted to drive said epicyclic gearing, and said epicyclic gearing arranged on the opposite side of the driven gear to the said one end of the power input shaft.

2. An axle, for driving road wheels of a motor vehicle, including an axle casing, a driving gear, a driven gear meshing with said driving gear, bearing means supporting said driving gear and said driven gear for rotation about their respective axes, said bearing means arranged for the axis of rotation of said driving gear to lie in a plane at right-angles to a plane containing the axis of rotation of said driven gear whereby said driving gear and said driven gear constitute a right-angle gear drive, said driven gear adapted to drive the said road wheels, the axis of rotation of said driving gear spaced from the axis of rotation of said driven gear, a two-speed epicyclic gearing carried by said axle casing, a power input shaft to said epicyclic gearing, a power output member from said epicyclic gearing, driving means interconnecting said power output member from said epicyclic gearing to said driving gear, said power output member from said epicyclic gearing and said driving gear formed with a coaxial bore, said power input shaft extending through said bore, one end of said power input shaft adapted to be driven from a power source, the other end of said power input shaft adapted to drive said epicyclic gearing, said epicyclic gearing arranged on the opposite side of the driven gear to the said one end of the power input shaft, and said driven gear arranged for its longitudinal axis to cross the power input shaft intermediate its said one end and said driving gear.

3. An axle, for driving road wheels of a motor vehicle, including an axle casing, a driving gear, a driven gear meshing with said driving gear, bearing means supporting said driving gear and said driven gear for rotation about their respective axes, said bearing means arranged for the axis of rotation of said driving gear to lie in a plane at right-angles to a plane containing the axis of rotation of said driven gear whereby said driving gear and said driven gear constitute a right-angle gear drive, said driven gear adapted to drive the said road wheels, a two-speed epicyclic gearing carried by said axle casing, a power input member to said epicyclic gearing, a power output member from said epicyclic gearing, driving means interconnecting said power output member from said epicyclic gearing to said driving gear, a first gear wheel coaxial with and rotatively secured to said driving gear, a second gear wheel meshing said first gear wheel to be driven therefrom, a speedometer drive, a pump for supplying oil under pressure for operating said epicyclic gearing, and said speedometer drive and said pump connected to be driven from said second gear wheel.

4. An axle, for driving road wheels of a motor vehicle, including an axle casing, a driving gear, a driven gear meshing with said driving gear, bearing means supporting said driving gear and said driven gear for rotation about their respective axes, said bearing means arranged for the axis of rotation of said driving gear to lie in a plane at right-angles to a plane containing the axis of rotation of said driven gear whereby said driving gear and said driven gear constitute a right-angle gear drive, said driven gear adapted to drive the said road wheels, the axis of rotation of said driving gear spaced from the axis of rotation of said driven gear, a two-speed epicyclic gearing carried by said axle casing, a power input shaft to said epicyclic gearing, a power output member from said epicyclic gearing, driving means interconnecting said power output member from said epicyclic gearing to said driving gear, said power output member from said epicyclic gearing and said driving gear formed with a coaxial bore, said power input shaft extending through said bore, one end of said power input shaft adapted to be driven from a power source, the other end of said power input shaft adapted to drive said epicyclic gearing, said epicyclic gearing arranged on the opposite side of the driven gear to the said one end of the power input shaft, a first gear wheel coaxial with and rotatively secured to said driving gear, a second gear wheel meshing said first gear wheel to be driven therefrom, a speedometer drive, a pump for supplying oil under pressure for operating said epicyclic gearing, and said speedometer drive and said pump connected to be driven from said second gear wheel.

5. An axle, for driving road wheels of a motor vehicle, including an axle casing, a driving gear, a driven gear meshing with said driving gear, bearing means supporting said driving gear and said driven gear for rotation about their respective axes, said bearing means arranged for the axis of rotation of said driving gear to lie in a plane at right-angles to a plane containing the axis of rotation of said driven gear whereby said driving gear and said driven gear constitute a right-angle gear drive, said driven gear adapted to drive the said road wheels, the axis of rotation of said driving gear spaced from the axis of rotation of said driven gear, a two-speed epicyclic gearing carried by said axle casing, a power input shaft to said epicyclic gearing, a power output member from said epicyclic gearing, driving means interconnecting said power output member from said epicyclic gearing to said driving gear, said power output member from said epicyclic gearing and said driving gear formed with a coaxial bore, said power input shaft extending through said bore, one end of said power input shaft adapted to be driven from a power source, the other end of said power input shaft adapted to drive said epicyclic gearing, said epicyclic gearing arranged on the opposite side of the driven gear to the said one end of the power input shaft, said driven gear arranged for its longitudinal axis to cross the power input shaft intermediate its said one end and said driving gear, a first gear wheel coaxial with and rotatively secured to said driving gear, a second gear wheel meshing said first gear wheel to be driven therefrom, a speedometer drive, a pump for supplying oil under pressure for operating said epicyclic gearing, and said speedometer drive and said pump connected to be driven from said second gear wheel.

6. An axle, for driving road wheels of a motor vehicle, including an axle casing, a driving gear, a driven gear meshing with said driving gear, bearing means supporting said driving gear and said driven gear for rotation about their respective axes, said bearing means arranged for the axis of rotation of said driving gear to lie in a plane at right-angles to a plane containing the axis of rotation of said driven gear whereby said driving gear and said driven gear constitute a right-angle gear drive, said driven gear adapted to drive the said road wheels, a two-speed epicyclic gearing carried by said axle casing, a power input member to said epicyclic gearing, a power output member from said epicyclic gearing, driving means interconnecting said power output member from said epicyclic gearing to said driving gear, a gear wheel coaxial with and rotatively secured to said driving gear, a gear train driven by said gear wheel, a speedometer drive connected to be driven from said gear train, and said gear train including two gears constituting a gear pump for supplying oil under pressure for operating said epicyclic gearing.

7. An axle, for driving road wheels of a motor vehicle, including an axle casing, a driving gear, a driven gear meshing with said driving gear, bearing means supporting said driving gear and said driven gear for rotation about their respective axes, said bearing means arranged for the axis of rotation of said driving gear to lie in a plane at right-angles to a plane containing the axis of rotation of said driven gear whereby said driving gear and said driven gear constitute a right-angle gear drive, said driven gear adapted to drive the said road wheels, the axis of rotation of said driving gear spaced from the axis of rotation of said driven gear, a two-speed epicyclic gearing carried by said axle casing, a power input shaft to said epicyclic gearing, a power output member from said epicyclic gearing, driving means interconnecting said power output member from said epicyclic gearing to said driving gear, said power output member from said epicyclic gearing and said driving gear formed with a coaxial bore, said power input shaft extending through said bore, one end of said power input shaft adapted to be driven from a power source, the other end of said power input shaft adapted to drive said epicyclic gearing, said epicyclic gearing arranged on the opposite side of the driven gear to the said one end of the power input shaft, a gear wheel coaxial with and rotatively secured to said driving gear, a gear train driven by said gear wheel, a speedometer drive connected to be driven from said gear train, and said gear train including two gears constituting a gear pump for supplying oil under pressure for operating said epicyclic gearing.

8. An axle, for driving road wheels of a motor vehicle, including an axle casing, a driving gear, a driven gear meshing with said driving gear, bearing means supporting said driving gear and said driven gear for rotation about their respective axes, said bearing means arranged for the axis of rotation of said driving gear to lie in a plane at right-angles to a plane containing the axis of rotation of said driven gear whereby said driving gear and said driven gear constitute a right-angle gear drive, said driven gear adapted to drive the said road wheels, the axis of rotation of said driving gear spaced from the axis of rotation of said driven gear, a two-speed epicyclic gearing carried by said axle casing, a power input shaft to said epicyclic gearing, a power output member from said epicyclic gearing, driving means interconnecting said power output member from said epicyclic gearing to said driving gear, said power output member from said epicyclic gearing and said driving gear formed with a coaxial bore, said power input shaft extending through said bore, one end of said power input shaft adapted to be driven from a power source, the other end of said power input shaft adapted to drive said epicyclic gearing, said epicyclic gearing arranged on the opposite side of the driven gear to the said one end of the power input shaft, said driven gear arranged for its longitudinal axis to cross the power input shaft intermediate its said one end and said driving gear, a gear wheel coaxial with and rotatively secured to said driving gear, a gear train driven by said gear wheel, a speedometer drive connected to be driven from said gear train, and said gear train including two gears constituting a gear pump for supplying oil under pressure for operating said epicyclic gearing.

References Cited by the Examiner
UNITED STATES PATENTS

| | | | |
|---|---|---|---|
| 2,312,263 | 2/1943 | Ormsby | 74—695 |
| 2,459,705 | 1/1949 | Julien | 74—700 |
| 2,911,854 | 11/1959 | Fabian | 74—695 |

DAVID J. WILLIAMOWSKY, *Primary Examiner.*

L. H. GERIN, *Assistant Examiner.*